(12) United States Patent
Watts

(10) Patent No.: US 6,372,111 B1
(45) Date of Patent: Apr. 16, 2002

(54) METHOD AND APPARATUS FOR RECLAIMING A METAL FROM A CMP PROCESS FOR USE IN AN ELECTROPLATING PROCESS

(76) Inventor: David K. Watts, 625 Camelia Ct., #2209, Hayward, CA (US) 94544

(*) Notice: Subject to any disclaimer, the term of this patent is extended or adjusted under 35 U.S.C. 154(b) by 0 days.

(21) Appl. No.: 09/510,295

(22) Filed: Feb. 22, 2000

Related U.S. Application Data

(63) Continuation-in-part of application No. 09/484,933, filed on Jan. 18, 2000.

(51) Int. Cl.[7] ............................ B24B 57/00; C25D 21/18
(52) U.S. Cl. ..................... 205/101; 204/267; 204/269; 205/574; 205/771; 205/772; 451/60; 451/287
(58) Field of Search .......................... 205/98, 99, 101, 205/574, 771, 772; 204/267, 269; 451/60, 287

(56) References Cited

U.S. PATENT DOCUMENTS

| | | | |
|---|---|---|---|
| 3,999,564 A | | 12/1976 | Pesek |
| 4,468,305 A | * | 8/1984 | Hillis .......................... 205/574 |
| 4,500,396 A | * | 2/1985 | D'Agostino et al. ......... 205/576 |
| 5,664,990 A | | 9/1997 | Adams |
| 5,755,614 A | | 5/1998 | Adams |
| 5,791,970 A | | 8/1998 | Yueh |
| 6,096,185 A | * | 8/2000 | Corlett et al. ................ 205/742 |
| 6,110,011 A | * | 8/2000 | Somekh et al. ................ 451/28 |

\* cited by examiner

Primary Examiner—Kathryn Gorgos
Assistant Examiner—W. T. Leader

(57) ABSTRACT

A method and apparatus is disclosed for reclaiming a metal from the effluent of a chemical mechanical planarization (CMP) process and using the reclaimed metal in an electroplating process. The steps of the method include using a chemical solution in a CMP process to remove material from a semiconductor device. An effluent is produced by this step that contains a dissolved first species removed from the semiconductor device. Then a second step of treating the effluent is performed to remove the dissolved first species and to produce a reclaimed metal. Then a third step of using the metal in an electroplating process is performed.

26 Claims, 8 Drawing Sheets

METHOD AND APPARATUS FOR RECLAIMING A METAL FROM A CMP PROCESS FOR USE IN AN ELECTROPLATING PROCESS

This application is a continuation-in-part application of Ser. No. 09/484,933 filed Jan. 18, 2000.

BACKGROUND OF THE INVENTION

1. Field of the Invention

The present invention relates generally to chemical mechanical planarization (CMP) and electroplating of a metal film on semiconductor devices, and more particularly, to a method and apparatus for reclaiming a metal from the effluent of a CMP process and using said reclaimed metal in an electroplating process.

2. Description of Related Art

Electroplating or electrodeposition, is a well-known process used to deposit metals such as copper from a chemical solution onto an electrode called a cathode and is described in the following articles, that are hereby incorporated by reference:
1. Loweheim, F. A., ed., *Modern Electroplating*, $3^{rd}$ edition, Electrochemical Society, 1974.
2. Paunovic, M. and Schlesinger, M., *Fundamentals of Electrodeposition*, Electrochemical Society Series, John Wiley and Sons, 1998.

Electroplating has recently received a tremendous amount of attention as a process for depositing a metal such as copper onto the surface of a semiconductor device. Prior art FIG. 1 is a schematic representation of the typical components of an electroplating system. In this representation, an electroplating chemical solution 205 is fed from a larger storage chamber (not shown) into an electroplating chamber 210. The electroplating chamber 210 contains an anode 215 and a cathode 220, both of which are immersed in the chemical solution 205. The anode 215 and cathode 220 may be constructed of copper, platinum, carbon, steel, or other conductive materials typically used for electrodeposition. Electricity is generated from a power source 225 and is passed between the anode 215 and cathode 220 such that electrons flow from the anode 215, through the wire 230, to the cathode 220. The power source 225 may be a battery, a potentiostat or other potential creating device that is well known in the industry.

As is well known in electrodeposition, this will cause a reduction reaction to occur at the cathode 220 and an oxidation reaction to occur at the anode 215. In electroplating, the reduction reaction is a chemical reaction where a species which is on the surface of the electrode, or is dissolved in the chemical solution 205, such as a positively charged metal ion ($M^+$), gets reduced, i.e. charged by at least one electron as represented by the following reaction:

This causes the metal (M) to become "plated" onto the cathode so that a metal film is grown onto the surface of the cathode 220. The metal may be any conductive material such as copper, tungsten, aluminum, iron, nickel, titanium, tantalum, palladium, iridium, platinum, silver, or metal alloys. In the semiconductor industry, a semiconductor wafer containing semiconductor devices is typically used as the cathode 220 causing a film of metal to become plated onto the semiconductor devices on the wafer.

An oxidation reaction is a chemical reaction where a species at the anode 215 gives up at least one electron. The species in an oxidation reaction might be a species in the chemical solution 205 such as negatively charged ions ($An^-$) which become oxidized as represented by the following reaction:

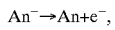

The species in an oxidation reaction might also be the metal material of the anode 215. In this case, during processing the metal loses at least one electron and becomes dissolved in the chemical solution 205 as is represented by the following reaction:

CMP is a well-known process used to remove and planarize materials on a semiconductor device such as copper, tungsten, aluminum, silicon, silicon dioxide, or silicon nitride. As part of the semiconductor device fabrication process, these types of materials are normally deposited on the surface of a semiconductor device by typical methods such as electroplating or chemical vapor deposition and then removed and planarized using a CMP process. Prior art FIG. 2 is a perspective view of a CMP system used to perform a conventional CMP process with an exploded cross-sectional view 9 of a semiconductor device being planarized. In FIG. 2, the CMP system 5 includes a polishing pad 10, placed on a rotating table 12. The semiconductor wafer 14 containing the semiconductor device is held in a rotating carrier 16, and the front surface 17 of the semiconductor device on the wafer 14 is rubbed against the polishing pad 10 to planarize the semiconductor device.

During a conventional CMP process, a chemical liquid 18 is also required and is delivered to the CMP system 5 by a first delivery device 7. Although not shown, typically a fine particle abrasive such as alumina or silica, normally already mixed into the chemical liquid 18 and known conventionally as a slurry, is also required for the CMP process. The diameter of the abrasive particles typically ranges from ten nanometers to ten microns. The abrasive particles need not be already mixed in the chemical liquid 18, but rather may be embedded in the polishing pad 10. Alternatively, the abrasive particles may also be separately delivered to the CMP system 5 by a second delivery device (not shown) and mixed with the chemical liquid 18 on the polishing pad 10. In operation, the chemical liquid 18 and/or slurry is used to continuously wet the polishing pad 10 while the pad 10 is mechanically rubbed against the front surface 17 of the semiconductor device enabling removal and planarization of the deposited material on the wafer 14.

Recently, CMP and electroplating have received a tremendous and growing amount of investigation and engineering as enabling technologies for manufacturing high-speed semiconductor devices. This is because high-conductivity copper is now being used as the interconnect material (replacing aluminum) to connect multiple semiconductor devices on a semiconductor device. Electroplating has been used to deposit copper on semiconductor wafers. With the use of copper, more and more layers are formed on a single semiconductor device and in a more compact area. With the additional layers, the CMP and the electroplating processes are both used more frequently since each such layer requires metal deposition and planarization prior to adding subsequent layers. Thus, the electroplating and CMP processes are becoming increasingly more necessary as more layers are formed and increasingly more important to the overall semiconductor manufacturing process.

Two areas of concern in both the CMP and electroplating processes are the high cost of consumables used and the environmental impact of discarding used CMP and electroplating chemical liquids. In electroplating, the high cost of consumables generally stems from items that are "consumed" during processing such as the electroplating chemical solution or the anode material that becomes dissolved during processing as described in FIG. 1. In CMP, the high cost of consumables generally stems from items such as the chemical liquid or slurry and polishing pads of FIG. 2, to name a few. For example, a copper CMP process may require about 600 cubic centimeters of chemical liquid for each semiconductor wafer processed. At this rate, a semiconductor manufacturing facility that produces 5,000 completed semiconductor wafers each week, and that requires six copper CMP processes for each completed semiconductor wafer, may require about one million liters of chemical liquid each year for the copper CMP process. At current slurry costs of about $10.00 per liter, this translates to a cost of over ten million dollars annually.

As mentioned above, disposal of the used CMP chemical liquids or the CMP effluent is another concern in CMP processing. Prior art FIG. 3 is a typical disposal system for CMP effluent in a semiconductor manufacturing facility. In Prior Art FIG. 3, a chemical liquid or slurry 20 contained in storage tank 25 is sent to the CMP system 30, such as the CMP system 5 of prior art FIG. 2. The "used" slurry or chemical liquid from the CMP process flows through a drain 31 and is sent to a facility 35 for adherence to environmental regulations.

For a copper CMP process, the facility 35 might remove dissolved copper in order to meet Environmental Protection Agency (EPA) requirements for maximum permitted contamination or effluent levels. For example, these EPA requirements for maximum permitted effluent levels may be 0.6 parts per million. In a copper CMP process on semiconductor wafers of 200 millimeters in diameter, with a film of deposited copper that is one micrometer in thickness, the concentration of copper in the effluent produced during copper CMP processing would be about 500 parts per million. This effluent would likely require costly procedures to remove the copper contained in the effluent.

To relieve these concerns, several solutions have been suggested. For example, in U.S. Pat. Nos. 5,664,990 titled "Slurry Recycling in CMP Apparatus," and 5,755,614 titled "Rinse Water Recycling in CMP Apparatus," a solution of capturing a used slurry (in one patent) and rinse water (in the other patent) after the CMP process to continuously blend the used slurry or rinse water with fresh slurry is disclosed. However, there is no disclosure in these patents for removing dissolved materials, such as dissolved copper, from the slurry or rinse water. Only a filtration system is disclosed that removes particles that have not been dissolved in the slurry or rinse water. Thus, the recycled slurry still contains much of the dissolved material that was removed from the semiconductor wafer during the CMP process, which, in turn, degrades the quality of the recycled slurry. Additionally, there is no mention in this patent of reclaiming a metal from the CMP effluent for use in an electroplating process.

U.S. Pat. No. 5,791,970 titled "Slurry Recycling System for Chemical-Mechanical Polishing Apparatus" also discloses a manner of recycling CMP slurry using an endpoint-monitoring system. The endpoint-monitoring system monitors the impact of the slurry on the removal rate of the CMP process and accordingly controls the rate of recycled slurry usage, thereby reducing any negative impact the recycled slurry may have on the CMP process. This solution, however, much like the prior patents discussed above, does not provide for removing the dissolved material found in the effluent that is removed from the surface of the semiconductor wafer. Again, the recycled slurry contains contaminated, dissolved materials that degrade the quality of the recycled slurry and affects the performance of the CMP process using that recycled slurry. Also, there is no mention in this patent of reclaiming a metal from the CMP effluent for use in an electroplating process.

A need therefore exists for a method in electroplating and in CMP that alleviates the high costs of consumables used and that reduces waste in such process. Any solution to this need must be capable of doing more than merely filtering particles in the slurry. The solution must be capable of removing dissolved materials from a used slurry or chemical liquid, and reusing the reclaimed chemical solution or reclaimed metal without having a detrimental impact on the performance of the CMP and/or electroplating processes.

SUMMARY OF THE INVENTION

The present invention provides for a method of reclaiming a metal from the effluent of a CMP process and using said reclaimed metal in an electroplating process. The invention also provides a method of rejuvenating a chemical solution used in a first CMP process for reuse in a second CMP process. This method is performed in three steps. A first step uses the chemical solution in a first CMP process to remove a metal material from a semiconductor device undergoing the first CMP process. This step produces an effluent that contains a dissolved first species removed from the semiconductor device during the first CMP process. The second step involves treating the effluent with a first electroplating process to remove the dissolved first species. This second step may produce a rejuvenated chemical solution that may then be used in a second CMP process. The second step causes the dissolved first species to be electroplated as a reclaimed metal. The third step uses the reclaimed metal in a second electroplating process.

The dissolved first species may include, for example, ions of copper, tungsten, aluminum, iron, nickel, titanium, tantalum, palladium, iridium, platinum, silver and the like.

In one embodiment of the present invention, as part of the treating step of the method of the present invention, the step of adding a second species, such as an oxidizer, to the rejuvenated chemical solution is included. This adding step, in this embodiment, may be performed before, after, or simultaneous to, the treating step of the method of the present invention.

In another embodiment of the treating step of the method of the present invention, ion exchanging is performed to remove the dissolved first species from the effluent.

In a further embodiment of the present invention, the treating step of the method of the present invention may be performed by precipitating the dissolved first species. In yet another embodiment, an additional filtering step is performed to remove particles from the effluent, which may also be removed using a centrifuging method.

The apparatus of the present invention includes, in one embodiment, a CMP means for removing material from a semiconductor device producing an effluent containing a dissolved first species, a first electroplating means for treating the effluent to remove the dissolved first species and produce a reclaimed metal, and a second electroplating means in which the reclaimed metal is used. The CMP means, in one embodiment, includes a polishing pad, a rotating table, a wafer containing a semiconductor device and a rotating carrier to hold the wafer. The CMP means further includes delivery devices to deliver a chemical solution to the wafer and a waste device to remove used chemical solutions from a CMP process. The first and second electroplating means, in one embodiment, each include an electroplating chemical solution, a chemical solution storage chamber, an electroplating chamber, an anode, a cathode, and a power source such as a battery or a potentiostat. In one embodiment, the cathode of the first electroplating means is used as the anode of the second electroplating means.

In another embodiment, the CMP means and the second electroplating means are separate chambers integrated together into a larger device.

It is noted that the CMP and electroplating means are not limited to the components described in this embodiment, but includes all well-known components used to CMP or electroplate materials. For example, instead of a rotating table and/or a rotating carrier, said CMP means may include any mechanism that can cause the relative motion of the wafer against the polishing pad. As another example, the CMP and/or electroplating means may include components for cleaning and/or drying the surfaces of the materials either during or after processing. Such components may include, brush scrubbers, megasonic devices, and/or spin-rinse dryers.

In several embodiments an ion exchange device, a filtering device, and/or a centrifuging device are used to treat the effluent from the CMP process. The ion exchange device performs the well-known procedure where a material (e.g. resin) in a system removes a first ion while a second ion is introduced to the system to thereby "exchange" the ions. The filtering device and the centrifuging device each perform the well-known procedure of removing a solid particle from the CMP effluent. In one embodiment, the ion exchange device and the filtering device are used in addition to the electroplating device to produce a rejuvenated chemical solution and a reclaimed metal.

BRIEF DESCRIPTION OF THE DRAWINGS

A better understanding of the present invention can be obtained when the following detailed description of a preferred embodiment is considered in conjunction with the following drawings, in which.

Prior art

Prior art

Prior art

Figure 1:
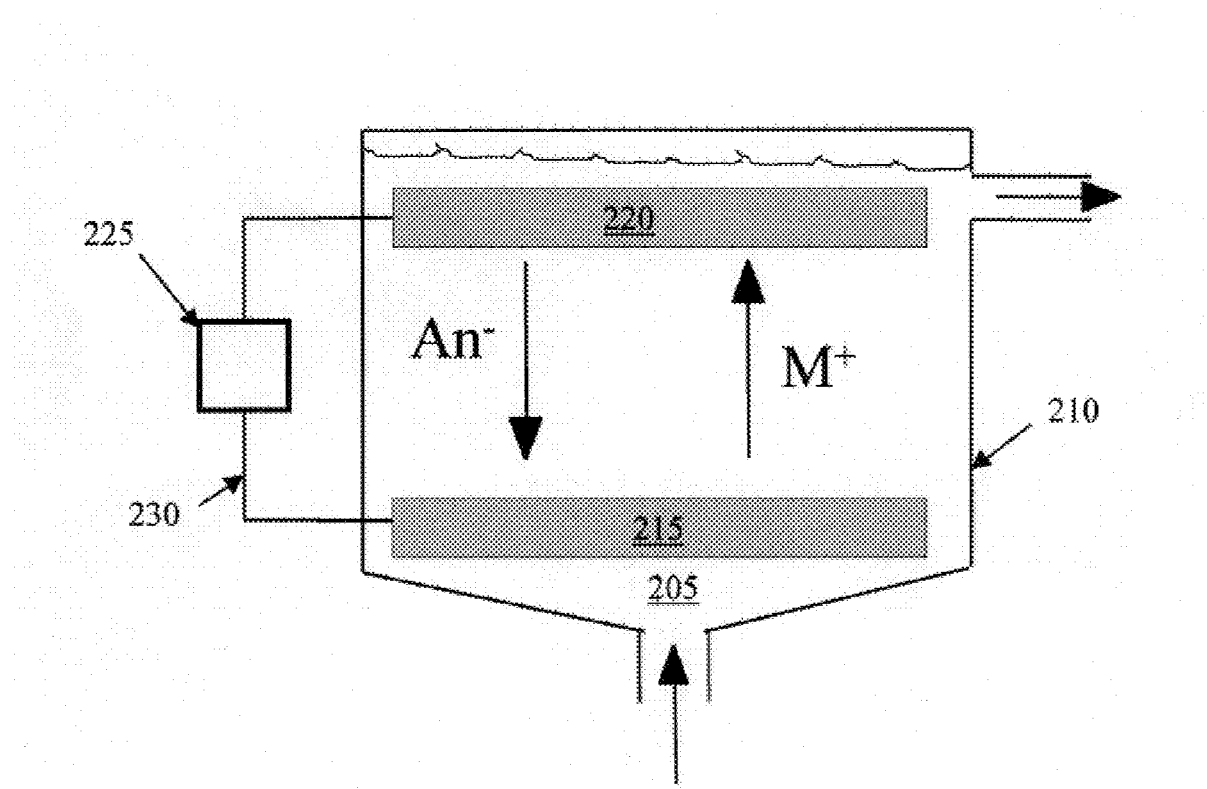
FIG. 1 is a perspective view of an electroplating system to deposit metal material on a surface.

It will be appreciated that for simplicity and clarity of illustration, elements illustrated in the drawings have not necessarily been drawn to scale. For example, the dimensions of some of the elements are exaggerated relative to other elements for purposes of clarity. Further, where considered appropriate, reference numerals have been repeated among the drawings to represent corresponding or analogous element.

DETAILED DESCRIPTION OF PREFERRED EMBODIMENTS

Figure 4:
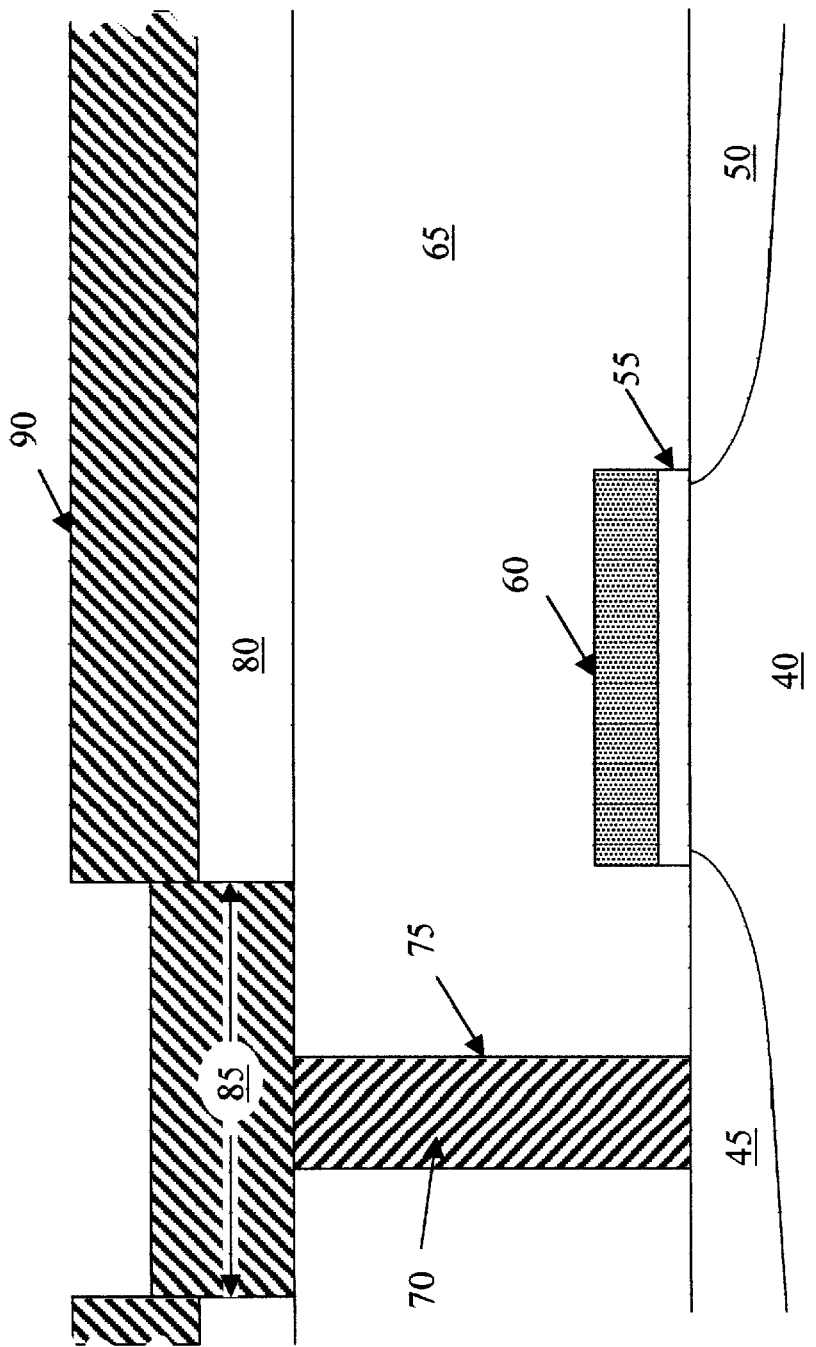
FIG. 4 is a cross-sectional view of an embodiment of a semiconductor device to be planarized using an embodiment of the method of the present invention and the apparatus of the present invention.

FIG. 4 is a cross-sectional view of a semiconductor device that will be planarized using an embodiment of the method of the present invention. In FIG. 4, the semiconductor device is formed from a substrate 40 that may be made of any conventional semiconductor material such as monocrystalline silicon, germanium, silicon on insulator or other types of semiconductor wafer material. A source region 45 and a drain region 50 have been formed in the substrate 40 using conventional semiconductor depositing techniques after formation of the gate oxide 55 and gate 60. As is well known in the industry, gate oxides 55 are typically formed of insulating type of material such as silicon dioxide while the gate 60 is a conducting material such as tungsten or polysilicon. The drain 50 and source 45 regions likewise are made of conventional semiconductor material that is doped of n-type or p-type conductivity. Following formation of the gate 60, a first interlevel dielectric (ILD) layer 65 is formed. The ILD layer 65 may be made of any conventional dielectric material such as silicon dioxide or materials with low dielectric constant such as organic polymers. The ILD layer 65 is etched, as is well known in the art, to form an opening that is filled with a first conductive material 70 such as silicon, copper, tungsten, aluminum, iron, nickel, titanium, tantalum, palladium, iridium, platinum or silver, to form a contact plug 75. Although it is not shown, the contact plug 75 may also be lined with a diffusion barrier material such as tungsten nitride, titanium nitride or tantalum nitride between the first ILD material 65 and the first conductive material 70. The contact plug 75 provides ohmic contact to the source region 45. Although it is not shown in the cross sectional plane of FIG. 4, a similar contact plug, as contact plug 75, is formed for the drain region 50.

Still in FIG. 4, a second ILD layer 80 is formed and etched, using conventional techniques known to those skilled in the art, to form trench 85. The trench 85 is then filled with a second conductive material 90 such as copper, tungsten, aluminum, iron, nickel, titanium, tantalum, palladium, iridium, platinum or silver. In one embodiment of the method of the present invention, the trench is filled with copper using the second electroplating process. The cross sectional plane in FIG. 4 shows the second conductive material 90 in ohmic contact with the contact plug 75. Although it is not shown, there may also be a diffusion barrier material such as tungsten nitride, titanium nitride or tantalum nitride between the second ILD material 80 and the second conductive material 90. The thickness of the second conductive material 90 is typically on the order of 300 nanometers to 1500 nanometers. It is noted that the dimensions and methods of depositing the layers shown in FIG. 4 are well known to those skilled in the art.

It is understood that the manner of making the semiconductor device of FIG. 4 is well known in the art and therefore the description above relating to FIG. 4 is sufficient to enable one of ordinary skill in the art to form such device to be planarized using the method and apparatus of the present invention. It is further noted that the material removed and planarized by the CMP method and apparatus of the present invention may be any of the materials typically used in semiconductor device fabrication such as silicon, silicon dioxide, silicon nitride, titanium, titanium nitride, tantalum, tantalum nitride, tungsten, tungsten nitride, iron, nickel, palladium, iridium, platinum, silver, aluminum or copper.

Figure 5:
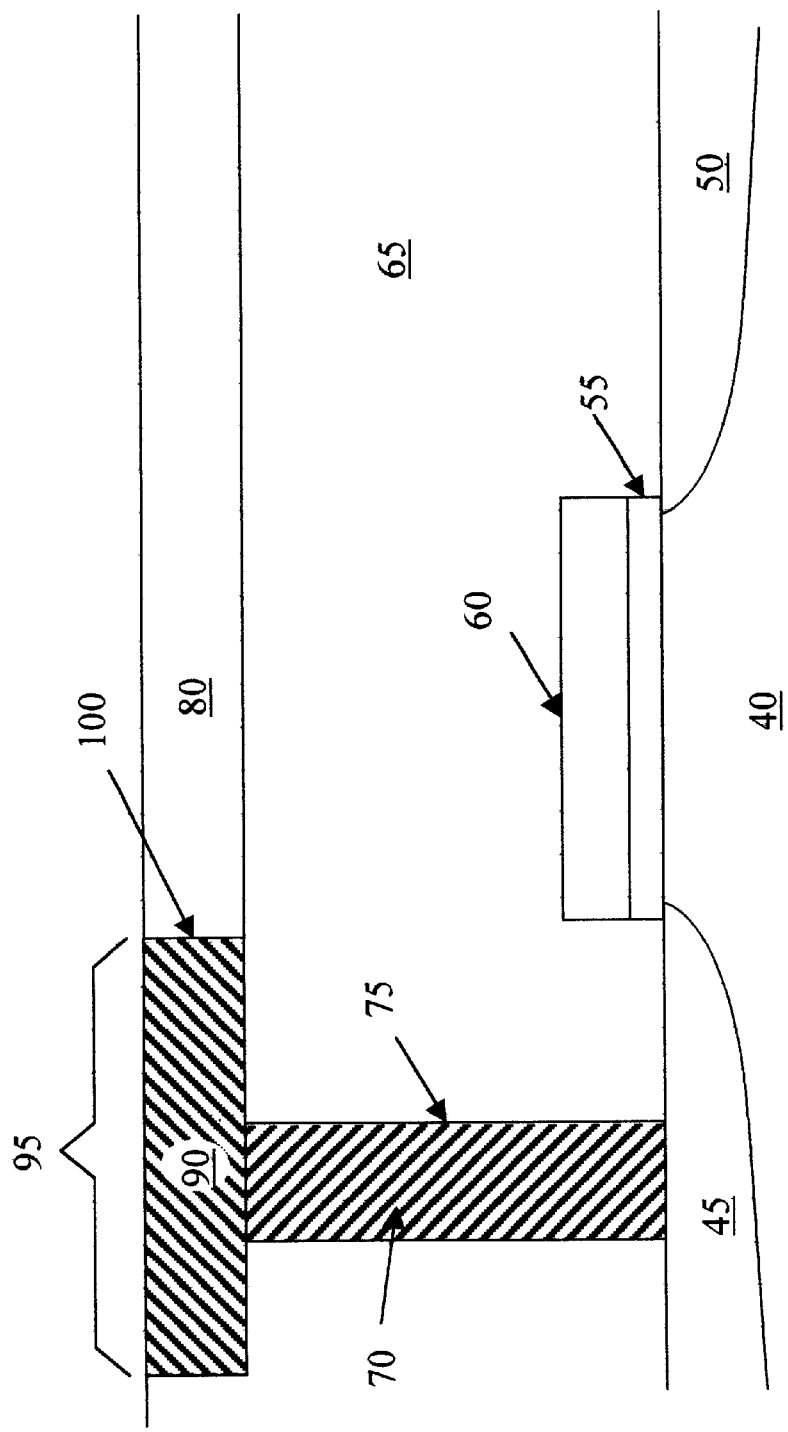
FIG. 5 is a cross-sectional view of an embodiment of a semiconductor device after being planarized using an embodiment of the method of the present invention and the apparatus of the present invention.

FIG. 5 is a cross-sectional view of the semiconductor device of FIG. 4 after such device has been planarized using an embodiment of the method and apparatus of the present invention. In FIG. 5, the second conductive material 90 of FIG. 4 has been planarized and removed to form an interconnect line 100. The CMP process planarizes and removes the second conductive material 90 such that the second conductive material 90 remains in the trench 95 and is coplanar with the second ILD layer 80.

Figure 2:
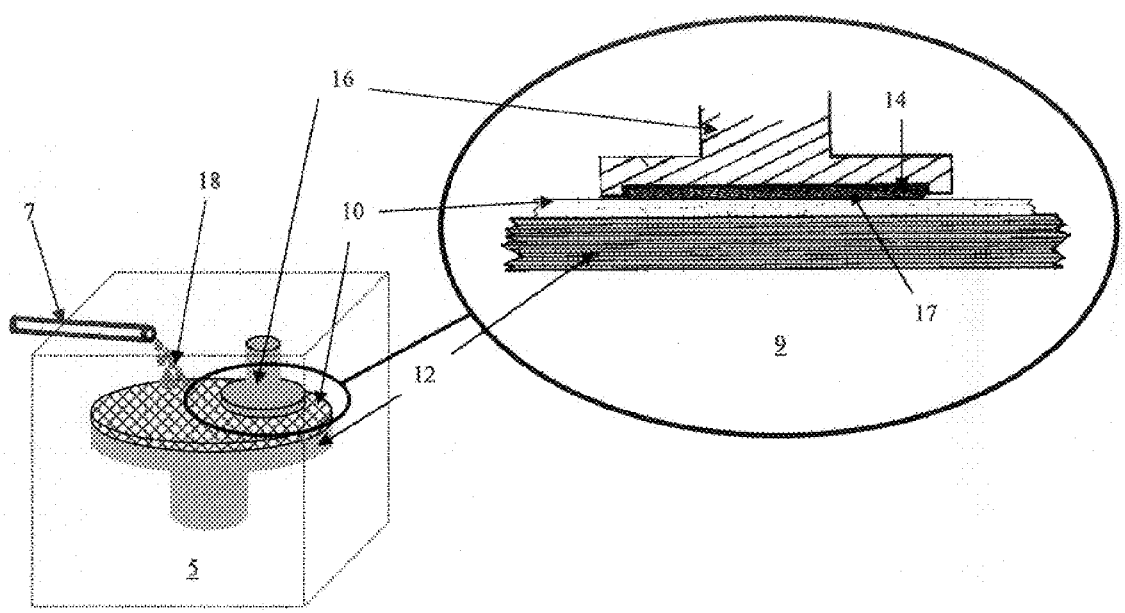
FIG. 2 is a perspective view of a CMP system used to perform a conventional CMP process with an exploded cross-sectional view of a semiconductor device being planarized.
Figure 6:
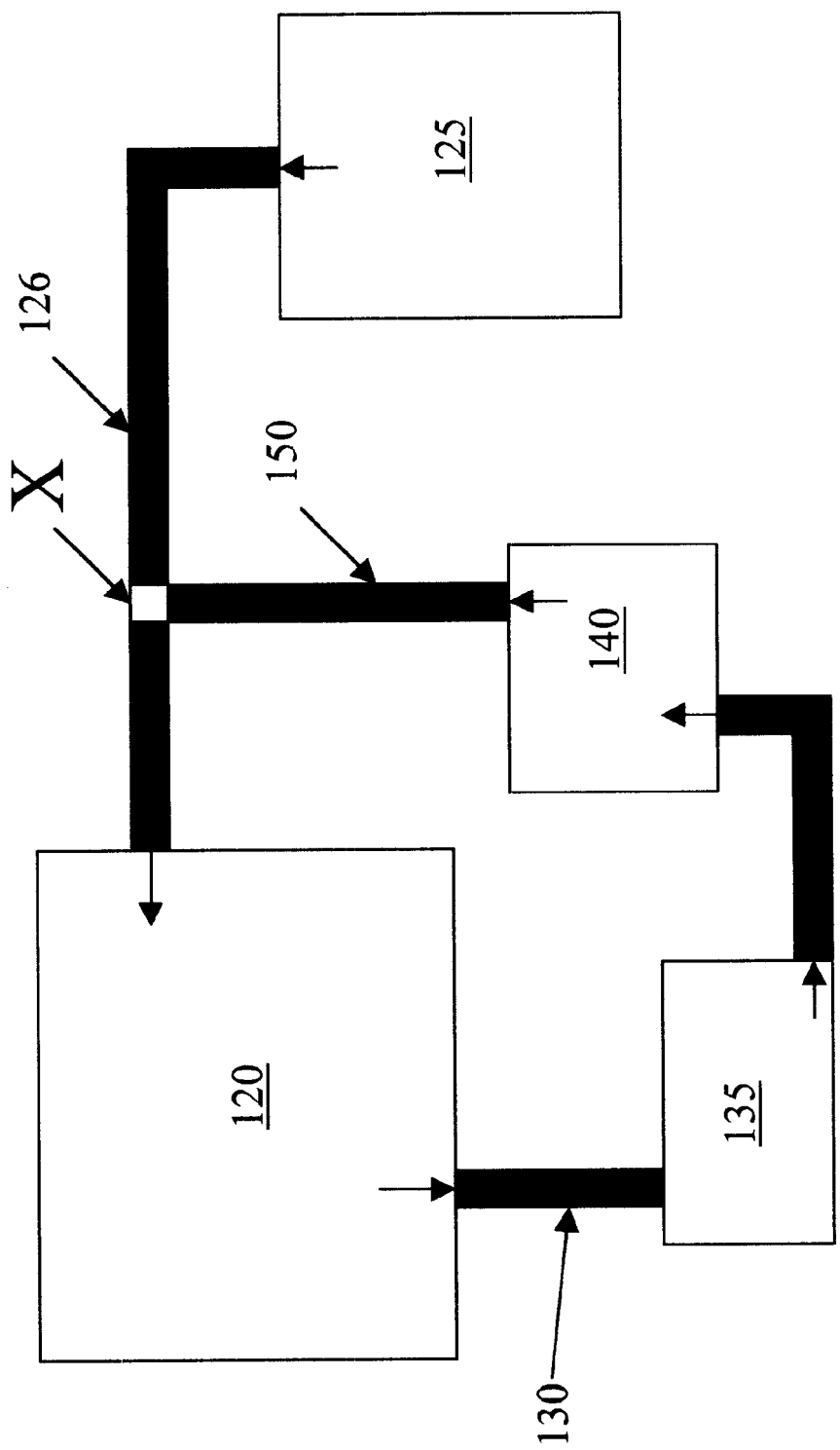
FIG. 6 is a schematic view of an embodiment of the CMP apparatus of the present invention.

FIG. 6 is an embodiment of the CMP apparatus of the present invention. In FIG. 6, a CMP means 120 for removing materials from a semiconductor device is shown. The CMP means 120 includes the items of prior art FIG. 2 (not shown), including a semiconductor wafer having semiconductor devices thereon, a rotating table to place the wafer on, a polishing pad and a rotating table. The semiconductor wafer (not shown) containing the semiconductor device is held in a rotating carrier (not shown), and the front surface of the semiconductor device on the wafer is rubbed against the polishing pad (not shown) to remove and planarize the semiconductor device. It is noted that the CMP means further includes a chemical solution (not shown) contained in storage tank 125 that is used to remove material from the semiconductor device being planarized.

The chemical solution contained in storage tank 125 and delivered to the CMP means 120 by the delivery device 126 is either a conventional slurry containing fine particle abrasive particles such as alumina or silica, or a chemical solution not containing fine particle abrasive particles. Typical chemical solutions may contain one or more of the following: acids, bases, oxidizing agents, surfactants, complexing agents, or other organic and inorganic chemical species.

In one embodiment, the CMP means 120 performs a portion of the CMP process. The CMP process involves a number of separate CMP processes. That is, in this embodiment, a first CMP process may be followed by a second CMP process and so on. Each CMP process involves transferring the chemical solution that is drawn from the storage tank 125 and/or drawn from the treating means 140 to the CMP means 120. In the case where the second conductive material 90 in FIG. 4 is copper, the starting chemical solution may contain one or more oxidizing agents (Ox) such as hydrogen peroxide, ammonium periodate, ferric nitrate or any other oxidizing agent. The oxidizing agent can react with the copper causing the copper to become oxidized and the oxidizing agent to become reduced as represented by the following chemical reaction:

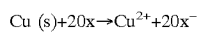
$$Cu\ (s) + 2Ox \rightarrow Cu^{2+} + 2Ox^-$$

Cu (s) is the symbol for solid metal copper and Ox represents the oxidizing agent. The oxidized copper species, $Cu^{2+}$, and the reduced oxidizing agent species, $Ox^-$, will typically be dissolved in a waste solution (not shown) that is transferred, in this embodiment, to a filtering means 135 by the drain 130. Additionally, the chemical solution may also contain complexing agents that can bind to the oxidized copper, $Cu^{2+}$, during the CMP process and form a copper complex that is typically dissolved in the waste solution.

In the embodiment shown in FIG. 6, the first CMP process begins at the storage tank 125 by sending chemical solution or slurry to the CMP means 120. The storage tank 125 typically contains "fresh" or unused chemical solution or slurry. After the CMP means 120 performs the CMP on the semiconductor device, the used chemical solution or slurry, termed "effluent," is drained through the drain 130 to the filtering means 135. The effluent contains numerous dissolved species, including a dissolved first species such as copper. The filtering means 135 involves a filtering step in which a solid or undissolved particle is removed from the effluent. The filtering step may involve flowing the effluent through a filter or membrane enabling the solid particle to be trapped in the filter or membrane.

In a further embodiment, the filtering means 135 may also involve a centrifuge step in which the solid particle is removed by centrifugal force generated by rotation. The centrifuge step may be instead of, or in addition to, the filtering step. Having removed solid particle or particles, the effluent containing dissolved first species then flows out of the filtering means 135 and is transferred to the treating means 140. The treating means 140 takes the effluent from the filtering means 135 and treats the effluent by electroplating to remove the dissolved first species to produce a reclaimed metal. In this embodiment, a rejuvenated chemical solution is also produced. The rejuvenated chemical solution is sent out of the treating means 140 through the treating drain 150. In this embodiment, the rejuvenated chemical solution is mixed with unused chemical solution or slurry, sent from storage tank 125, at position X. At position X, a second CMP process begins by mixing the rejuvenated chemical solution from the treating means 140 with the fresh slurry and sending both of these items to the CMP means 120.

It is noted that the first CMP process may use either unused chemical solution from storage tank 125, or rejuvenated chemical solution from the treating means 140, or a mix of chemical solutions from both the storage tank 125 and the treating means 140. It is also noted that the chemical solution exiting the treating means 140 contains less dissolved first species than the effluent exiting the CMP means 120 through the drain 130.

The treating means 140 is any apparatus that performs electrodeposition or electroplating as is well-known in the art, that is, an electroplating device. Electrodeposition, or electroplating, is a well-known process for plating a metal such as copper onto an electrode. In an embodiment of the method of the present invention, a first electroplating process in a first electroplating device treats the effluent from a copper CMP process. The copper is plated onto an electrode and is reclaimed, and the electrode with the reclaimed copper is used as an electrode in a second electroplating device.

In one embodiment, the CMP means and the second electroplating means are separate chambers integrated together into a larger device.

In a further embodiment, a monitoring means may be added to the CMP apparatus of the present invention to monitor the concentration of the dissolved first species in the effluent. For example, the monitoring means may be optical or electrochemical based technologies, atomic absorption, or any means that is able to detect the extent to which the dissolved first species has been removed. It is noted that the monitoring means may be present in the CMP apparatus in various locations throughout the apparatus, including at the drain 130 of FIG. 6 to monitor how much dissolved first species is in the effluent after leaving the CMP means of FIG. 6. Said monitoring means may also be present within the treating means 140 in FIG. 6.

In another embodiment of the method of the present invention, ion exchanging is performed to remove the dissolved first species from the effluent. This ion-exchange step may be performed before, after, or during the first electroplating process. Ion exchanging performs the well-known procedure where a material (e.g. resin) in a system removes a first ion while a second ion is introduced to the system to thereby "exchange" the ions.

Figure 7:
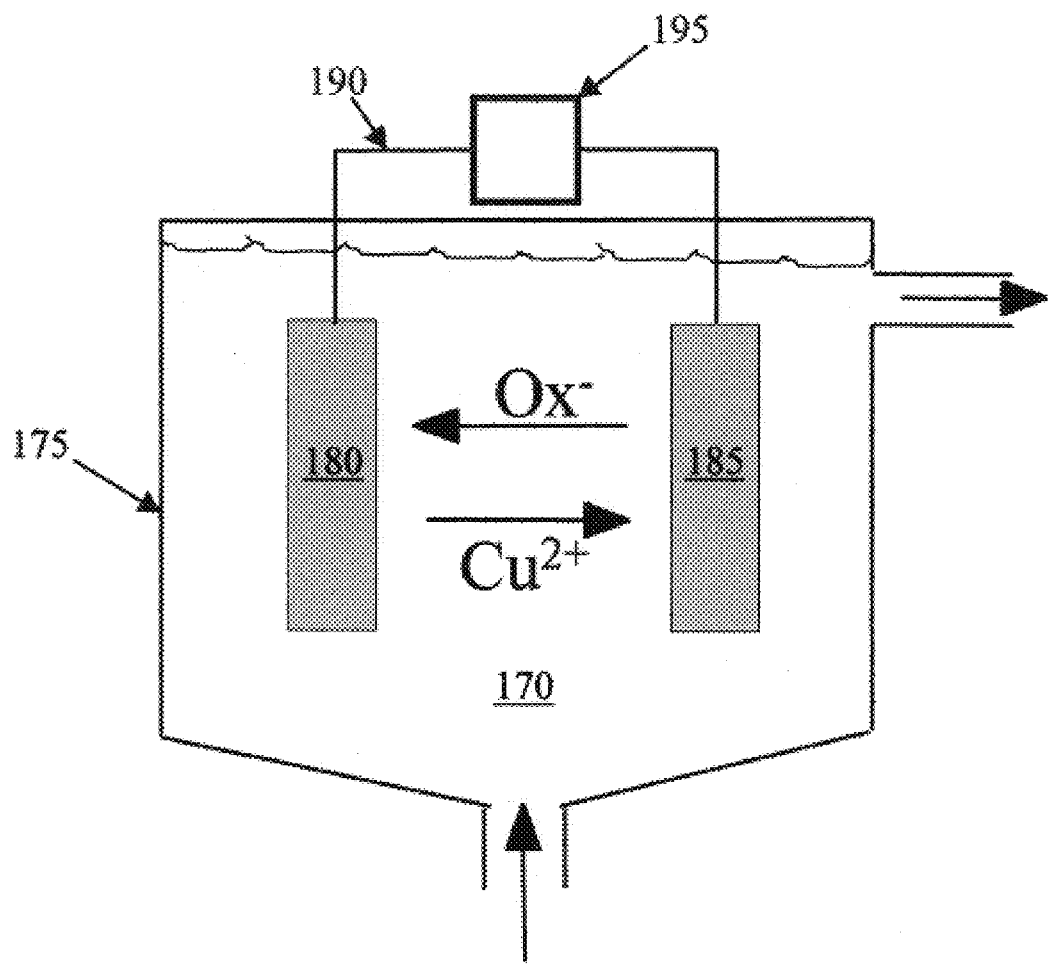
FIG. 7 is a schematic view of an embodiment of the apparatus of the first electroplating device of the present invention.

FIG. 7 is a schematic view of an embodiment of the treating means shown in FIG. 6. In FIG. 7, the effluent 170 is contained in a chamber 175 and the anode 180 and the cathode 185 are immersed in the effluent 170. The anode 180 and cathode 185 may be constructed of copper, platinum, carbon, steel, aluminum or other conductive materials typically used for electrodeposition. Electricity is generated from a power source 195 and is passed between the anode 180 and cathode 185 such that electrons flow from the anode 180, through the wire 190, to the cathode 185. The power source 195 may be a battery, a potentiostat or other potential creating device that is well known in the industry. As is well known in electrodeposition, this will cause a reduction reaction to occur at the cathode 185. A reduction reaction is a chemical reaction where a species in a liquid gets reduced, i.e. charged by at least one electron. In one embodiment, copper ions, $Cu^{2+}$, that were generated during the first CMP process as described previously, migrate through the effluent and undergo the following reduction reaction at the cathode 185:

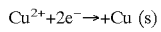

$$Cu^{2+} + 2e^- \rightarrow Cu\ (s)$$

Where $e^-$ represents electrons generated at the cathode 185. This will reclaim solid metal copper as a copper film becomes plated onto the cathode 185. In one embodiment, the cathode 185 shown in FIG. 7 is used in the first electroplating process to reclaim the copper. After this reclaiming step, the cathode 185, on which the reclaimed copper is deposited, is removed and used as the anode in a second electroplating process.

As is also well known in electrodeposition, an oxidation reaction will occur at the anode 180. In one embodiment, the reduced oxidizing agent species, $Ox^-$, migrate through solution and undergo the following reduction reaction at the cathode 185:

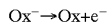

$$Ox^- \rightarrow Ox + e^-$$

Electricity will continue to flow until the concentration of copper has been reduced to a predetermined acceptable level. The copper concentration of the effluent from a copper CMP process may range from 1 to 1000 parts per million and may be reduced by greater than 99% by the electrodeposition process.

Figure 3:
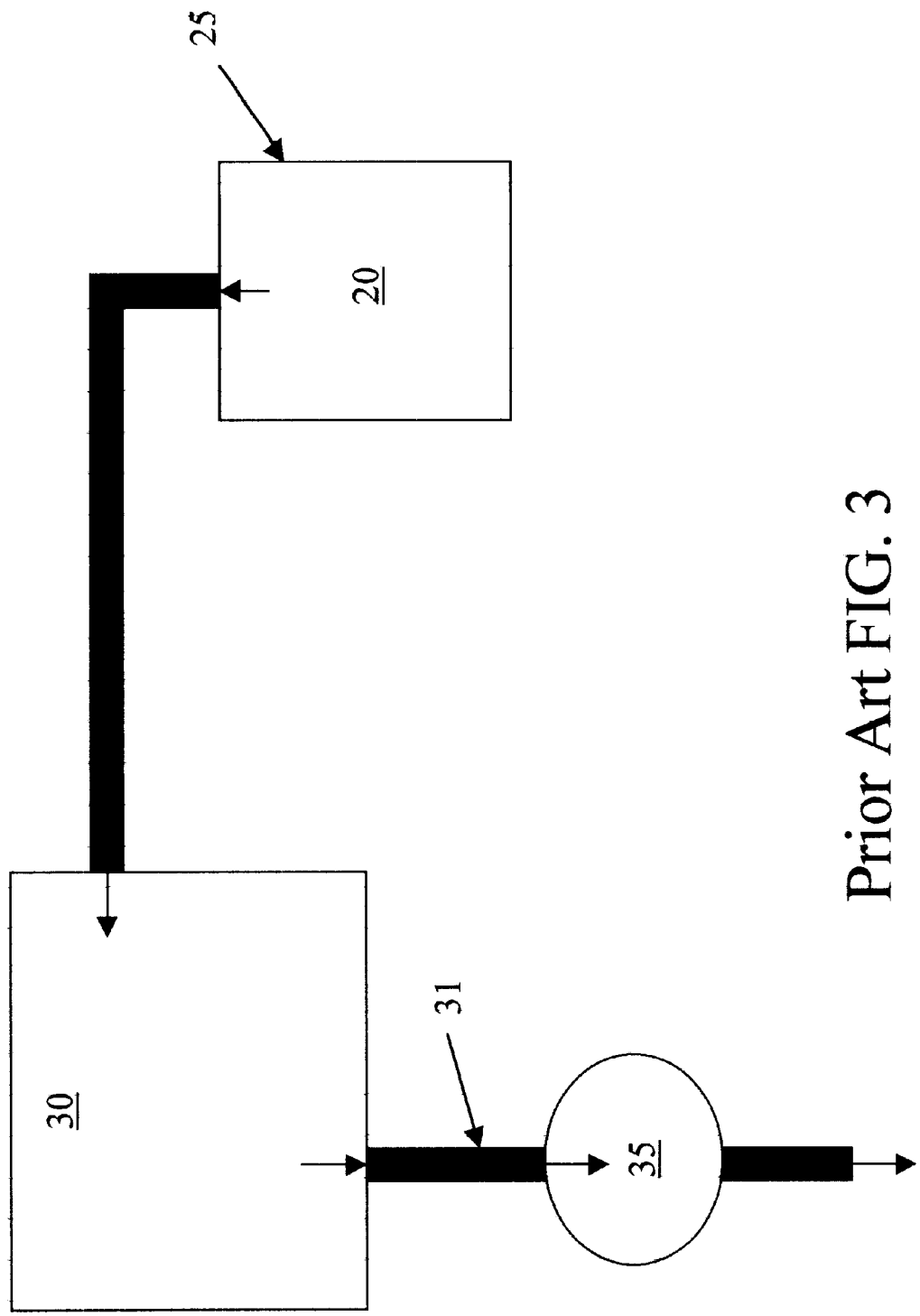
FIG. 3 is a schematic representation of a conventional CMP disposal system.
Figure 8:
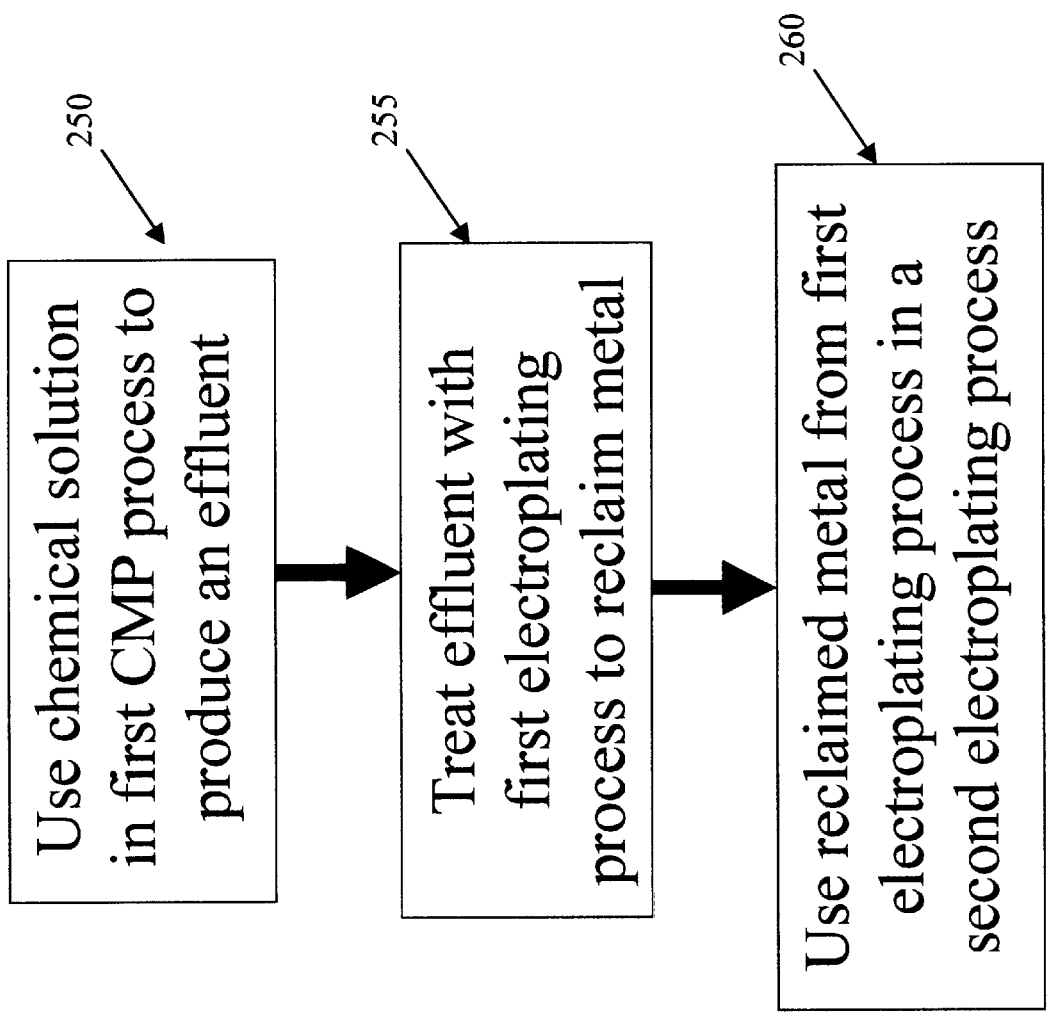
FIG. 8 is a flow chart of an embodiment of the method of the present invention.

FIG. 8 is a flow chart of an embodiment of the method of the present invention. In FIG. 8, a first step 250 uses the chemical solution in the CMP means 120 of FIG. 6 for the first CMP process to produce the effluent going into the drain 130 of FIG. 6. In this embodiment, the first step 250 removes material from the semiconductor device as shown in FIGS. 3 and 4. The effluent produced from this step contains the dissolved first species, such as one or more ions of copper, tungsten, aluminum, iron, nickel, titanium, tantalum, palladium, iridium, platinum, silver, and the like. The second step is the treating step 255 where the effluent is treated to remove dissolved first species as listed above. This treating step may produce a rejuvenated chemical solution for reuse in the second CMP process described with regard to FIG. 6. This treating step is accomplished by a first electroplating process to remove the dissolved first species from the effluent and produce a reclaimed metal on the cathode 185 as shown in FIG. 7. In the third step the reclaimed metal from the treating step is used in a second electroplating process.

The treating step further includes, in another embodiment, a step of adding a second species to the rejuvenated chemical solution. This adding step may be performed before or after the effluent is treated, with, for example, the electroplating device of FIG. 7, or simultaneous to that treatment. In this embodiment, the second species is a component of the chemical solution that was reacted during the first CMP process such as an oxidizing agent. Typical oxidizing agents include, hydrogen peroxide, ferric nitrate, ammonium periodate and other inorganic and organic species. The second species may also be an acid, a base, a complexing agent, levelers, brighteners, or any other components that can enhance the electroplating or the CMP processes. Note that the mere treating step without the adding step rejuvenates the chemical solution, but the adding step further rejuvenates the solution.

The present invention contains numerous advantages. First, there is a tremendous cost benefit since metal and chemical solutions may be reused. The metal reclaimed in the first electroplating process may be reused in a second electroplating process and the effluent that resulted from the first CMP process may be reused after undergoing the treating step since the dissolved first species has been removed. The treated effluent may be combined with "fresh" slurry or be used alone. Second, since the dissolved first species is removed, and since the chemical solution is reused, the environmental impact of discarding the used solutions is lessened.

The embodiments herein have been described for use with copper, it is well understood that the present invention may be utilized during the CMP of other materials such as tungsten, aluminum, iron, nickel, titanium, tantalum, palladium, iridium, platinum or silver. In such cases, the consumables such as the pads, chemical solution, or abrasives used for the process may change as is well known in the art.

What is claimed is:

1. A method for reclaiming a metal from the effluent of a CMP process and using said reclaimed metal in an electroplating process, said method comprising the steps of:
   using a chemical solution in a first CMP process to remove a material from a semiconductor device, said using step producing an effluent containing a dissolved first species removed from said semiconductor device,
   treating said effluent by a first electroplating process to remove said dissolved first species and to produce a reclaimed metal; and
   using said reclaimed metal in an second electroplating process.

2. The method of claim 1, wherein said dissolved first species is selected from the group consisting of copper, tungsten, aluminum, iron, nickel, titanium, tantalum, palladium, iridium, platinum and silver.

3. The method of claim 1, wherein said treating step further comprises a step of adding a second species to said effluent.

4. The method of claim 3, wherein said adding step is performed after said treating step.

5. The method of claim 3, wherein said adding step is performed before said treating step.

6. The method of claim 3, wherein said adding step is performed simultaneous to said treating step.

7. The method of claim 6, wherein said adding step and said treating step are performed using an electroplating device.

8. The method of claim 1, further comprising a step of filtering said effluent to remove a particle from said effluent.

9. The method of claim 8, wherein said filtering step is performed after said using step and before said treating step.

10. The method of claim 1, further comprising a step of centrifuging said effluent to remove a particle from said effluent.

11. The method of claim 10, wherein said centrifuging step is performed after said using step and before said treating step.

12. The method of claim 1 wherein said treating step removes said dissolved first species to produce a rejuvenated chemical solution which is used in a second CMP process.

13. The method of claim 12, wherein said treating step further comprises a step of adding a second species to said rejuvenated chemical solution.

14. The method of claim 13, wherein said adding step and said treating step are performed using an electroplating device.

15. The method of claim 12, wherein said treating step further comprises a step of precipitating said dissolved first species.

16. The method of claim 12, further comprising a step of filtering said effluent to remove a particle from said effluent.

17. The method of claim 16, wherein said filtering step is performed after said using step and before said treating step.

18. The method of claim 12, further comprising a step of centrifuging said effluent to remove a particle from said effluent.

19. The method of claim 18, wherein said centrifuging step is performed after said using step and before said treating step.

20. The method of claim 12, wherein said treating step further comprises the step of ion exchanging said effluent to remove said dissolved first species.

21. The method of claim 12, wherein said dissolved first species is selected from the group consisting of copper, tungsten, aluminum, iron, nickel, titanium, tantalum, palladium, iridium, platinum and silver.

22. An electroplating apparatus for reclaiming a metal from the effluent of a CMP process for use in a an electroplating process, said apparatus comprising:

a CMP means for removing a material from a semiconductor device, said CMP means producing an effluent containing a dissolved first species removed from said semiconductor device a first electroplating means for treating said effluent by removing said dissolved first species to produce a reclaimed metal.

a second electroplating means for using said reclaimed metal in an electroplating process.

23. The apparatus of claim 22 wherein said CMP means and said second electroplating means are each separate chambers integrated together in one device.

24. The apparatus of claim 22 further comprising a means for monitoring a concentration of said dissolved first species.

25. The apparatus of claim 22 further comprising a means for monitoring a concentration of a second species.

26. The apparatus of claim 22 wherein said treating step produces a rejuvenated chemical solution.

* * * * *